US012681857B2

(12) United States Patent　　　(10) Patent No.:　US 12,681,857 B2
Milojicic et al.　　　　　　　　　(45) Date of Patent:　　Jul. 14, 2026

(54) GRAPH CACHE RECONFIGURATION

(71) Applicant: Hewlett Packard Enterprise Development LP, Spring, TX (US)

(72) Inventors: Dejan S. Milojicic, Palo Alto, CA (US); Giacomo Pedretti, San Francisco, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/828,665

(22) Filed: Sep. 9, 2024

(65) Prior Publication Data

US 2026/0072838 A1　　Mar. 12, 2026

(51) Int. Cl.
*G06F 12/08*　　(2016.01)
*G06F 12/0811*　　(2016.01)
*G06F 12/0864*　　(2016.01)

(52) U.S. Cl.
CPC ...... *G06F 12/0811* (2013.01); *G06F 12/0864* (2013.01)

(58) Field of Classification Search
CPC .......................... G06F 12/0811; G06F 12/0864
See application file for complete search history.

(56) References Cited

U.S. PATENT DOCUMENTS

| | | | |
|---|---|---|---|
| 10,802,807 B1 | 10/2020 | Hsu et al. | |
| 10,977,018 B1 | 4/2021 | Hwang et al. | |
| 11,036,546 B1 | 6/2021 | Bhandari et al. | |
| 11,108,644 B1 | 8/2021 | Mkrtchyan et al. | |
| 11,113,030 B1 | 9/2021 | Monga et al. | |
| 11,270,051 B1 | 3/2022 | Suresh et al. | |
| 11,301,295 B1 | 4/2022 | Gupta et al. | |
| 12,339,785 B2 | 6/2025 | Pedretti et al. | |
| 2010/0002502 A1* | 1/2010 | Dhong ................... | G11C 15/04 365/222 |
| 2020/0371761 A1 | 11/2020 | Gupta et al. | |
| 2021/0067549 A1 | 3/2021 | Chen et al. | |
| 2021/0089452 A1* | 3/2021 | Peng ................. | G06F 16/24552 |

(Continued)

OTHER PUBLICATIONS

Challapalle, N. et al., "GaaS-X: Graph Analytics Accelerator Supporting Sparse Data Representation using Crossbar Architectures," 2020 ACM/IEEE 47th Annual International Symposium on Computer Architecture (ISCA), Valencia, Spain, May 30-Jun. 3, 2020, doi: 10.1109/ISCA45697.2020.00044, pp. 433-445.

(Continued)

*Primary Examiner* — Masud K Khan
(74) *Attorney, Agent, or Firm* — Slater Matsil, LLP

(57)　　　　ABSTRACT

A graph cache may be dynamically reconfigured to adapt to changes in a graph or access requirements. In an implementation, the graph cache includes a content addressable memory (CAM) array comprising CAM rows and match lines, configured to receive an identifier of a target node of a graph structure and a key associated with a user credential, search for a combination of the identifier and key, and activate match lines corresponding to matching CAM rows. A random-access memory (RAM) array comprises RAM rows and word lines. A multiple match resolver serially activates word lines of the RAM array corresponding to activated match lines. A management processor receives an encrypted input, decrypts it to obtain the identifier and key, and provides the combination to the CAM array.

20 Claims, 16 Drawing Sheets

200

(56) References Cited

U.S. PATENT DOCUMENTS

| | | | |
|---|---|---|---|
| 2022/0156322 A1 | 5/2022 | Singh et al. | |
| 2022/0382885 A1* | 12/2022 | Durham | G06F 9/3004 |
| 2025/0103493 A1* | 3/2025 | Yeung | G06F 12/0895 |
| 2025/0181513 A1 | 6/2025 | Pedretti et al. | |

OTHER PUBLICATIONS

Mao, R. et al., "ReRAM-based graph attention network with node-centric edge searching and hamming similarity," 2023 60th ACM/IEEE Design Automation Conference (DAC), Jul. 9-13, 2023, San Francisco, CA, doi: 10.1109/DAC56929.2023.10247735, 6 pages.

Mohan, N. et al., "Design Techniques and Test Methodology for Low-Power TCAMs," IEEE Transactions on Very Large Scale Integration (VLSI) Systems, vol. 14, No. 6, Jun. 2006, doi: 10.1109/TVLSI.2006.878206, pp. 573-586.

* cited by examiner

100

300

200

400

500

1200

1500

Start

Obtain memory addresses for neighbor nodes from cache. 1502

Receive selection input. 1504

Select neighbor embedding at memory address. 1506

Access neighbor embedding. 1508

End

1600

Manage roles.
1602

Manage mode of
operation. 1604

Manage
partitions. 1606

Manage
embeddings. 1608

Operate. 1610

Change
needed? 1612

Yes

No

GRAPH CACHE RECONFIGURATION

CROSS-REFERENCE TO RELATED APPLICATIONS

This application is related to U.S. patent application Ser. No. 18/526,843, filed Dec. 1, 2023, which application is hereby incorporated herein by reference.

BACKGROUND

Graph neural networks (GNNs) are a class of machine learning algorithms designed to process and analyze data represented as graphs. They have gained prominence in various domains, such as traffic analysis, intelligence analysis, social networks, recommendation systems, biology, etc. For example, in the intelligence community, GNNs may be applied to analyze networks of individuals, organizations, events, etc. GNNs operate by aggregating information from neighboring nodes in a graph, enabling them to identify relationships and patterns within the data. A GNN includes multiple layers, each of which refines the node embeddings of a graph through a combination of node features and information from neighboring nodes. GNNs are useful for tasks such as node classification, link prediction, and graph classification.

BRIEF DESCRIPTION OF THE DRAWINGS

For a more complete understanding of this disclosure, and advantages thereof, reference is now made to the following descriptions taken in conjunction with the accompanying drawings.

Corresponding numerals and symbols in the different figures generally refer to corresponding parts unless otherwise indicated. The figures are drawn to clearly illustrate the relevant aspects of the disclosure and are not necessarily drawn to scale.

DESCRIPTION

Figure 1:
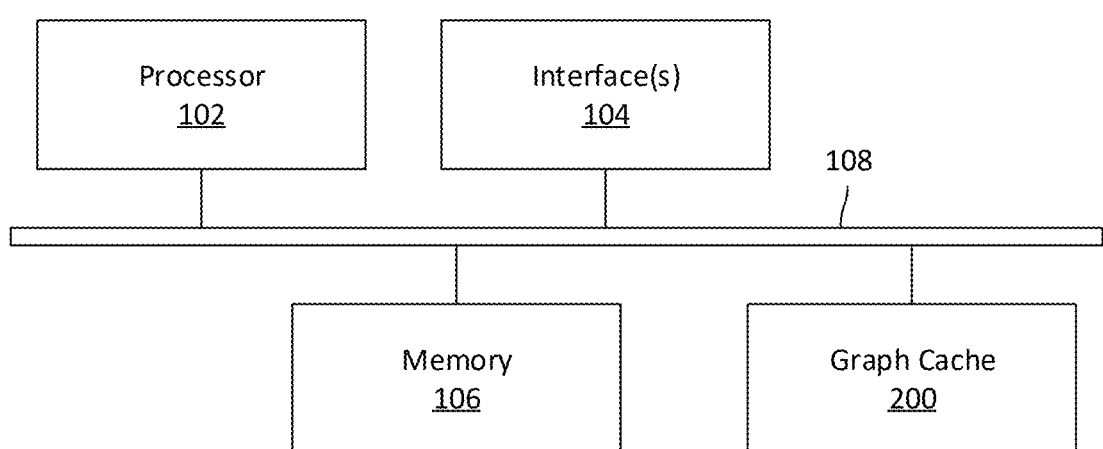
FIG. 1 is a block diagram of a computing system, according to some implementations.

The following disclosure provides many different examples for implementing different features. Specific examples of components and arrangements are described below to simplify the present disclosure. These are, of course, merely examples and are not intended to be limiting.

A graph represents the relations between a collection of entities. Specifically, a graph includes nodes (corresponding to the entities) and edges (corresponding to the relations between the entities). Each of these elements of a graph may include an embedding. A node embedding includes one or more pieces of information about the node.

A graph neural network (GNN) includes multiple layers. When processing a graph with a GNN, the network operates in multiple iterations, where each layer updates the embeddings of nodes in the graph. At each layer, the GNN aggregates information from neighboring nodes, updates the embedding of each node, and then moves to the next layer. This process continues for a fixed number of layers or until a convergence criterion is met.

The structure of a graph remains constant throughout processing with a GNN. In other words, the graph structure (represented by the edges connecting nodes) does not change as node embeddings are updated. The graph structure may be changed when the data underlying the graph is changed. One way to represent a graph structure for processing is with an adjacency matrix. However, adjacency matrices may consume a large amount of memory and may be sparsely populated—particularly for large graph structures—leading to inefficient memory utilization.

To address these inefficiencies, a graph cache is used to store a graph structure. The graph cache enables fast reconfiguration through its use of a content addressable memory (CAM) array and a random access memory (RAM) array. The CAM array stores identifiers for nodes of a graph structure, while the RAM array stores memory addresses of embeddings for neighbor nodes. This approach avoids the need for sparse adjacency matrices, improving memory utilization. When an identifier of a target node is provided to the CAM array, it activates match lines corresponding to rows storing that identifier. These activated match lines are then used to serially activate word lines in the RAM array, causing it to output memory addresses for neighbor nodes of the target node.

This architecture allows for rapid lookup of graph structure information and associated embedding data, facilitating efficient GNN processing. The graph cache acts as an accelerator, improving efficiency compared to storing graph structures in general-purpose memory. It enables one-shot lookup operations where memory addresses for neighbor embeddings can be quickly obtained based on a target node identifier. This fast lookup capability also allows for rapid reconfiguration of the graph neural network processing.

In some implementations, a graph cache allows for switching of users with different credentials to access different data and metadata within the graph structure. The graph cache may be partitioned, either physically or logically, to allow different access rights for different users. A management processor of the graph cache may enforce security, support switching functionality, and conduct management operations. The system may use public-private key pairs shared between users and the management processor to secure role switching. The graph cache may output memory addresses for nodes of a graph based on an input key pair. This allows for rapid changes in data accessibility without requiring reconfiguration of the entire graph structure or GNN processing pipeline.

In some implementations, a graph cache may allow for switching modes of operation between data ingestion and queries, which is particularly useful for updating graph structures or node information. During ingestion, packaged input data may be propagated to nodes within a graph. The nodes may be updated based on the data by updating the embeddings at their memory addresses. Furthermore, any changes to the graph structure that may be necessitated by the input data may be quickly made by updating the CAM array of the graph cache. This allows for rapid ingestion of new data in a graph.

In some implementations, a graph cache may allow for switching between different forms of embedding calculations. The system may rapidly switch between different configurations of embeddings. Specifically, node's memory address may correspond to multiple embeddings of the node. The embedding which is retrieved for a node may be selected based on the mode of embedding calculation, potentially indicated by a selection input to the graph cache.

FIG. 1 is a block diagram of a computing system 100 that can be used to process a graph with a GNN, according to some implementations. The computing system 100 may be implemented in an electronic device. Examples of electronic devices include servers, desktop computers, laptop computers, mobile devices, gaming systems, and the like.

The computing system 100 may be utilized in any data processing scenario, including stand-alone hardware, mobile applications, or combinations thereof. Further, the computing system 100 may be used in a computing network, such as a public cloud network, a private cloud network, a hybrid cloud network, other forms of networks, or combinations thereof. In one example, the methods provided by the computing system 100 are provided as a service over a network by, for example, a third party. The computing system 100 may be implemented on one or more hardware platforms, in which the modules in the system can be executed on one or more platforms. Such modules can run on various forms of cloud technologies and hybrid cloud technologies or be offered as a Software-as-a-Service that can be implemented on or off a cloud.

To achieve its desired functionality, the computing system 100 includes various hardware components. These hardware components may include a processor 102, one or more interface(s) 104, a memory 106, and a graph cache 200. The hardware components may be interconnected through a number of busses and/or network connections. In one example, the processor 102, the interface(s) 104, the memory 106, and the graph cache 200 may be communicatively coupled via a bus 108.

The processor 102 retrieves executable code from the memory 106 and executes the executable code. The executable code may, when executed by the processor 102, cause the processor 102 to implement any functionality described herein. The processor 102 may be a microprocessor, an application-specific integrated circuit, a microcontroller, or the like.

The interface(s) 104 enable the processor 102 to interface with various other hardware components, external and internal to the computing system 100. For example, the interface(s) 104 may include interface(s) to input/output devices, such as, for example, a display device, a mouse, a keyboard, etc. Additionally or alternatively, the interface(s) 104 may include interface(s) to an external storage device, or to a number of network devices, such as servers, switches, and routers, client devices, other types of computing devices, and combinations thereof.

The memory 106 may include various types of memory, including volatile and nonvolatile memory. For example, the memory 106 may include Random-Access Memory (RAM), Read-Only Memory (ROM), a Hard Disk Drive (HDD), and/or the like. Different types of memory may be used for different data storage needs. For example, in certain examples the processor 102 may boot from ROM, maintain nonvolatile storage in an HDD, execute program code stored in RAM, and store data under processing in RAM. The memory 106 may include a non-transitory computer readable medium that stores instructions for execution by the processor 102. One or more modules within the computing system 100 may be partially or wholly implemented as software and/or hardware for performing any functionality described herein. The memory 106 may include a general-purpose memory used to store data for the processor 102.

The graph cache 200 is an accelerator for processing a graph with a GNN. The graph cache 200 is different than the processor 102 and the memory 106, and specifically, is different than cache(s) of the processor 102 and the memory 106. Additionally, the architecture of the graph cache 200 is different than that of the memory 106. In some implementations, the graph cache 200 includes a content addressable memory (CAM) array and a random-access memory (RAM) array. The CAM array may be programmed with values corresponding to the edges of a graph structure. Thus, a graph structure may be stored in the CAM array. A CAM array may be able to store a graph structure more efficiently than general-purpose memory (e.g., the memory 106). Accordingly, use of the graph cache 200 may improve the efficiency of the computing system 100.

As subsequently described in greater detail, the graph cache 200 may be used by the processor 102 to accelerate processing of a graph with a GNN. The processor 102 may store a structure for a graph in the graph cache 200, and also store node embeddings of the graph in the memory 106. During processing, the processor 102 may update the embedding of a target node by aggregating the embeddings of neighbor nodes that are adjacent to the target node in the graph structure. The processor 102 may obtain the embeddings of the neighbor nodes by using the graph cache 200. Specifically, the processor 102 may provide an identifier for the target node to the graph cache 200. In response, the graph cache 200 returns the memory addresses for the embeddings of the neighbor nodes to the processor 102. The memory addresses are locations of the memory 106. The processor 102 may then directly access the embeddings of the neighbor nodes (from the memory 106) at the memory addresses provided by the graph cache 200. Thus, the graph cache 200 is used for a lookup operation, in which the memory addresses for the neighbor embeddings may be looked up in one shot based on the target node identifier.

Figure 2:
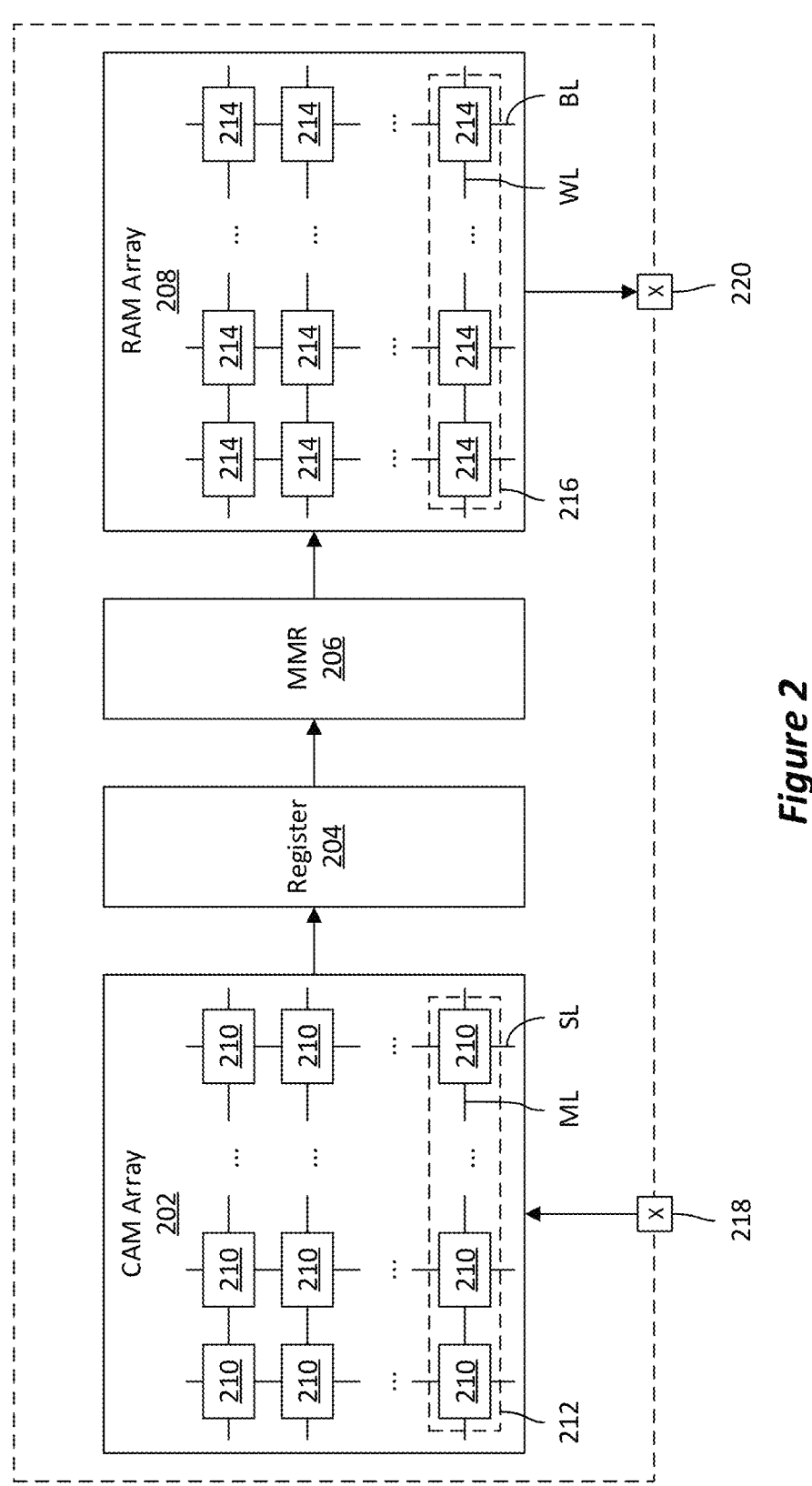
FIG. 2 is a block diagram of graph cache, according to some implementations.

FIG. 2 is a block diagram of a graph cache 200, according to some implementations. An example implementation of the graph cache 200 from the computing system 100 of FIG. 1 is shown. In this implementation, the graph cache 200 includes a CAM array 202, a register 204, a multiple match resolver 206, and a RAM array 208. Additionally, the graph cache 200 may include peripheral circuits (not separately illustrated) for operating the various components of the graph cache 200. Example peripheral circuits include read/write circuits for the CAM array 202, read/write circuits for the RAM array 208, a clock circuit for temporalizing operations in the graph cache 200, a control circuit for controlling the components of the graph cache 200, a management processor (subsequently described), and the like.

As previously noted, an edge is a connection between two adjacent nodes of a graph structure. The graph cache 200 stores a graph structure by storing values that represent the edges of the graph structure. Specifically, the graph cache 200 stores a plurality of edge connections. Each edge connection is a mapping between an identifier of a first node and a memory address for a second node. Thus, each edge connection represents an edge between a first node and a second node. During operation, a target node is provided to the graph cache 200. In response to receiving the identifier of the target node, the graph cache 200 returns the memory addresses for the mapped nodes that are connected to the target node by edges in the graph structure.

The CAM array 202 includes CAM cells 210, search lines SL, and match lines ML. The CAM cells 210 are arranged in rows and columns. The search lines SL are arranged along and correspond to the columns of the CAM cells 210. The match lines ML are arranged along and correspond to the rows of the CAM cells 210. The CAM cells 210 may be ternary CAM (TCAM) cells. A TCAM cell is adapted to store a low value (e.g., a binary 0), a high value (e.g., a binary 1), or a wildcard value. Examples of TCAM cells include SRAM-based TCAM cells, ReRAM-based TCAM cells, memristor-based TCAM cells, and the like.

A row of CAM cells 210 may be referred to as a CAM row 212. Each CAM row 212 stores a vector that includes multiple values (stored in the CAM cells 210 of the CAM row 212). A match line ML corresponds to a CAM row 212. The search lines SL correspond to the CAM cells 210 of the CAM rows 212.

During a write operation, a write vector of values (e.g., voltages) is applied to the CAM cells 210 of a CAM row 212, via bit lines. Each CAM cell 210 of the CAM row 212 may be set to a low value, a high value, or (optionally) a wildcard value, based on a corresponding value of the write vector. Thus, each CAM row 212 has a vector of values stored therein.

During a read operation, a read vector of values (e.g., voltages) is applied to the CAM rows 212, via the search lines SL. Each CAM cell 210 of a CAM row 212 compares its stored value to a corresponding value of the read vector. The CAM rows 212 having stored values that match the corresponding values of the read vector activate their corresponding match lines ML. In other words, during a read operation, the CAM array 202 receives a read vector, searches for the read vector in the CAM rows 212, and activates the match lines ML of the CAM rows 212 that store the read vector. The match lines ML of the CAM rows 212 that store a different vector than the read vector are deactivated.

As subsequently described in greater detail, identifiers for nodes of a graph structure will be stored in the CAM rows 212 of the CAM array 202. An identifier may be a vector of values stored in the CAM cell 210 of a CAM row 212. The CAM array 202 is adapted to receive (on the search lines SL) an identifier of a target node of the graph structure. Additionally, the CAM array 202 is adapted to search for the received identifier in the CAM rows 212, and activate ones of the match lines ML corresponding to the CAM rows 212 that store the identifier. Each of the CAM rows 212 that stores the identifier of the target node corresponds to an edge connecting the target node to neighbor nodes.

The register 204 is connected to the CAM array 202, and specifically, to the match lines ML of the CAM array 202.

The register 204 may include multiple latches, such as a latch for each CAM row 212. The register 204 is configured to store a match vector corresponding to the match lines ML of the CAM array 202. Each value of the match vector corresponds to a match line ML, and may be a low value (e.g., a binary 0) or a high value (e.g., a binary 1). Thus, the match vector includes high values (corresponding to the activated match lines ML) and low values (corresponding to the deactivated match lines ML). When a vector is searched for in the CAM array 202 during a read operation, the register 204 is used to latch in the result of the read operation. Thus, the match vector (reflecting the result of the read operation) stored in the register 204 may persist even if the search lines SL are reset.

The multiple match resolver 206 is connected to the register 204. The output of the register 204 may be connected to the input of the multiple match resolver 206. The multiple match resolver 206 is adapted to resolve conflicts that may arise when multiple match lines ML of the CAM array 202 are activated during a read operation. In some implementations, the multiple match resolver 206 is a match token multiple match resolver. However, any suitable network of logic gates may be utilized to implement the multiple match resolver 206. To resolve conflicts during the read operation, the multiple match resolver 206 converts the match vector stored in the register 204 into one or more output vectors.

The multiple match resolver 206 is adapted to serially generate output vectors corresponding to the high values of the match vector. One output vector is generated for each high value in the match vector. Each value of an output vector is a low value, except for the high value of the match vector to which the output vector corresponds. For example, if the match vector includes a first high value and a second high value (corresponding to two activated match lines ML), then two output vectors are generated: a first output vector having one high value corresponding to the first high value of the match vector, and a second output vector having one high value corresponding to the second high value of the match vector. The output vectors will be (serially) provided to the RAM array 208.

The RAM array 208 includes RAM cells 214, word lines WL, and bit lines BL. The RAM cells 214 are arranged in rows and columns. The word lines WL are arranged along and correspond to the rows of the RAM cells 214. The bit lines BL are arranged along and correspond to the columns of the RAM cells 214. The RAM cells 214 may be static random-access memory (SRAM) cells.

A row of RAM cells 214 may be referred to as a RAM row 216. Each RAM row 216 stores a vector that includes multiple values (stored in the RAM cells 214 of the RAM row 216). A word line WL corresponds to a RAM row 216. The bit lines BL correspond to the RAM cells 214 of the RAM rows 216.

During a write operation, a write vector of values (e.g., voltages) is applied to the RAM cells 214 of a RAM row 216, via the bit lines BL and word lines WL. Each RAM cell 214 of the RAM row 216 may be set to a low value or a high value, based on a corresponding value of the write vector. Thus, each RAM row 216 has a vector stored therein.

During a read operation, a word line WL of a RAM row 216 is activated. The RAM cells 214 of that RAM row 216 output their stored vector on the bit lines BL.

The match lines ML of the CAM array 202 are connected (via the register 204 and the multiple match resolver 206) to respective word lines WL of the RAM array 208. The multiple match resolver 206 is adapted to serially activate the word lines WL of the RAM array 208 corresponding to the match lines ML of the CAM array 202 that are activated. In other words, when a match line ML of a CAM row 212 is activated, a corresponding word line WL of a corresponding RAM row 216 is activated, thereby causing that RAM row 216 to output its stored vector on the bit lines BL.

As subsequently described in greater detail, memory addresses will be stored in the RAM rows 216 of the RAM array 208. Each memory address is a location, in an memory external to the graph cache 200, at which a node embedding is stored. When identifiers for nodes of a graph structure are stored in the CAM rows 212 of the CAM array 202, the memory addresses stored in the RAM rows 216 of the RAM array 208 point to embeddings of corresponding neighbor nodes. Specifically, a CAM row 212 may store an identifier of a target node, and the corresponding RAM row 216 may store a memory address pointing to an embedding of a neighbor node of the target node. Thus, when an identifier of a target node is provided to the CAM array 202, a CAM row 212 containing that identifier activates its match line ML; this causes the word line WL of a corresponding RAM row 216 to be activated, which causes the RAM row 216 to output (on the bit lines BL) the memory address for a neighbor node of the target node.

The graph cache 200 may include ports for external connection. In some implementations, the graph cache 200 further includes an input port 218 and an output port 220. The input port 218 is connected to the search lines SL of the CAM array 202. The output port 220 is connected to the bit lines BL of the RAM array 208.

Figure 3A:
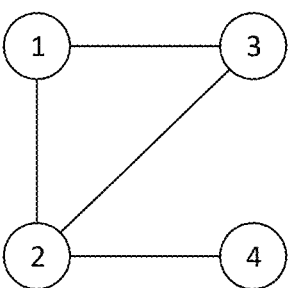
FIGS. 3A-3B illustrate an example of storing a graph structure in a graph cache.
Figure 3B:
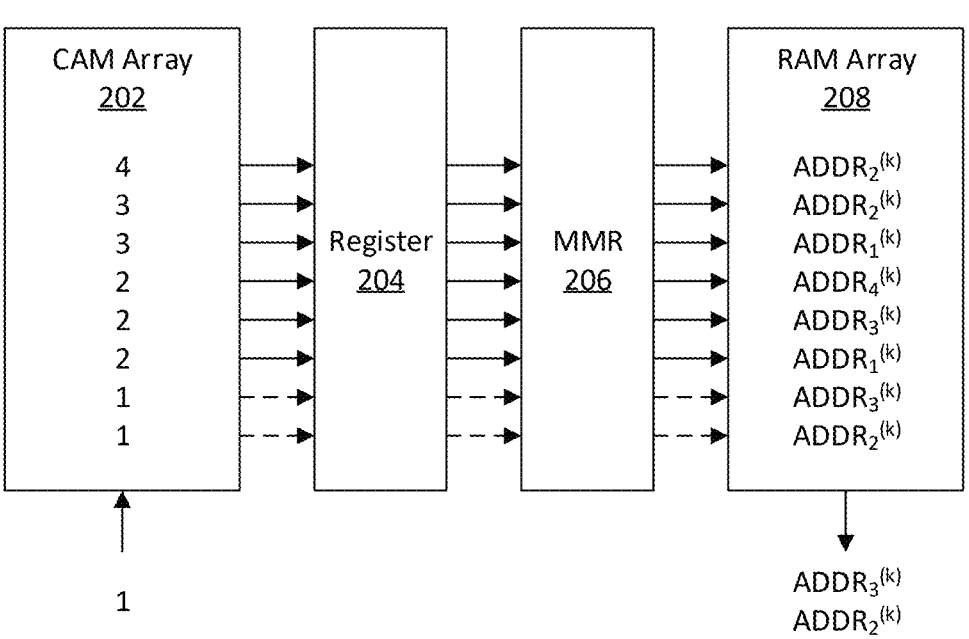

FIGS. 3A-3B illustrate an example of storing a graph structure in a graph cache. FIG. 3A is a diagram of an example graph structure 300, while FIG. 3B is a diagram of the values (representing the graph structure 300) stored in the graph cache 200. The CAM array 202 stores identifiers for nodes of the graph structure 300, while the RAM array 208 stores memory address of embeddings of neighbors of the nodes.

An example of a read operation is also shown in FIG. 3B. In this example, the target node is Node 1 of the graph structure 300. An identifier of the target node (e.g., 1) is provided to the CAM array 202. The rows containing that identifier activate their match lines. The matching outputs of the CAM array 202 are illustrated with dashed lines. As a result of those outputs being activated, the corresponding rows of the RAM array 208 are serially activated (by the multiple match resolver 206), which causes the RAM array 208 to serially output the memory address for neighbor nodes of the target node. In this example where Node 1 is connected to Node 2 and Node 3 in the graph structure 300, providing the identifier for Node 1 to the CAM array 202 causes the RAM array 208 to serially output the memory address for Node 2 $ADDR_2^{(k)}$ and the memory address for Node 3 $ADDR_3^{(k)}$. The embeddings for Node 2 and Node 3 are stored at those memory addresses.

Figure 4:
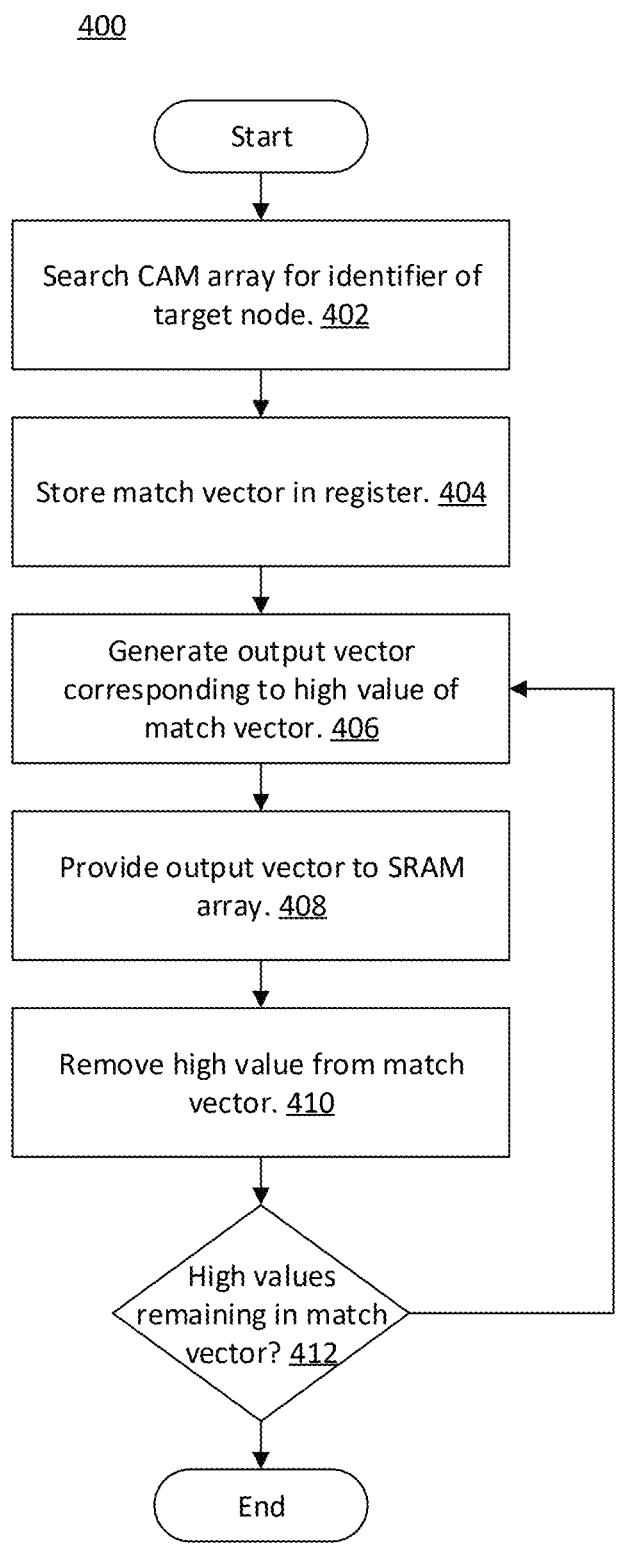
FIG. 4 is a flow diagram of a graph searching method, according to some implementations.

FIG. 4 is a flow diagram of a graph searching method 400, according to some implementations. The graph searching method 400 will be described in conjunction with the graph cache 200 of FIG. 2. The graph searching method 400 may be implemented by the graph cache 200. Specifically, the graph cache 200 may perform the graph searching method 400 to search for edge connections in a stored graph structure. Responsive to receiving an identifier of a target node, the memory address for each neighbor node of the target node will be returned by the graph cache 200.

The graph cache 200 may perform a step 402 of searching the CAM array 202 for the identifier of the target node. The identifier may be received at the input port 218, and thus may be provided on the search lines SL of the CAM array 202. The identifier may be a vector provided on the search lines SL during a read operation. A match vector is output by the CAM array 202.

The graph cache 200 may perform a step 404 of storing the match vector in the register 204. The match vector has high values corresponding to the CAM rows 212 that store the received identifier, and low values corresponding to the CAM rows 212 that store a different identifier. Each high value in the match vector corresponds to an edge connection between the target node and one of its neighbor nodes. The match vector is provided, by the register 204, to the multiple match resolver 206.

The graph cache 200 may perform a step 406 of generating an output vector. The output vector may be generated by the multiple match resolver 206. The output vector corresponds to one of the high values in the match vector. In some implementations, the output vector corresponds to the high value that is spatially lowest in the match vector. Each value of the output vector is a low value, except for the high value of the match vector to which the output vector corresponds.

The graph cache 200 may perform a step 408 of providing the output vector to the RAM array 208. The output vector may be provided, by the multiple match resolver 206, to the word lines WL of the RAM array 208. Because the output vector contains only one high value, only one word line WL is activated by the multiple match resolver 206. The RAM row 216 corresponding to the activated word line WL outputs its stored value (e.g., memory address for a neighbor node) on the bit lines BL. Thus, the memory address may be provided at the output port 220. An external processor may read this memory address from the graph cache 200.

The graph cache 200 may perform a step 410 of removing the high value of the output vector from the match vector stored in the register 204. The high value may be removed from the match vector by performing a bitwise AND of the match vector with the inverse of the output vector, and then storing the result of that operation back in the register 204.

The graph cache 200 may perform a step 412 of determining whether any high values remain in the match vector. In response to the match vector containing additional high values, the graph cache 200 repeats steps 406-412. These steps may be iteratively performed until no high values remain in the match vector. The quantity of iterations may be equal to the quantity of high values in the match vector.

An example of a match vector and corresponding output vectors is shown in Table 1. In this example, the target node identifier matches with three CAM rows 212 of the CAM array 202. As a result, the match vector initially stored in the register 204 contains three high values (corresponding to the activated match lines ML of the three CAM rows 212), and so three iterations of steps 406-412 are performed. The output vector generated by the multiple match resolver 206 in each iteration is different. The match vector stored in the register 204 is modified in each iteration.

TABLE 1

| Iteration | Match Vector | Output Vector |
|---|---|---|
| 1 | [0, 0, 1, 0, 1, 0, 1] | [0, 0 ,1, 0, 0, 0, 0] |
| 2 | [0, 0, 0, 0, 1, 0, 1] | [0, 0, 0, 0, 1, 0, 0] |
| 3 | [0, 0, 0, 0, 0, 0, 1] | [0, 0, 0, 0, 0, 0, 1] |

Figure 5:
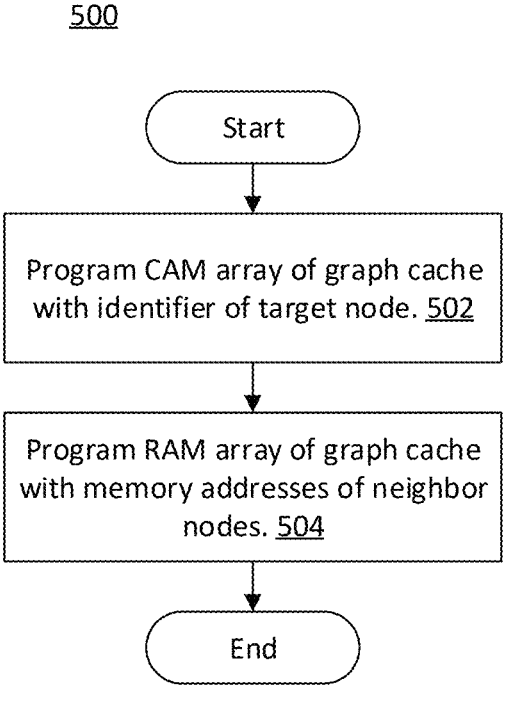
FIG. 5 is a flow diagram of a graph programming method, according to some implementations.

FIG. 5 is a flow diagram of a graph programming method 500, according to some implementations. The graph programming method 500 will be described in conjunction with the computing system 100 of FIG. 1 and the graph cache 200 of FIG. 2. The graph programming method 500 may be implemented by the computing system 100. Specifically, the processor 102 may perform the graph programming method 500 to store an edge of a graph structure (e.g., a mapping of a target node to a neighbor node) in the graph cache 200.

The processor 102 may perform a step 502 of programming the CAM array 202 of the graph cache 200 with an identifier of the target node. The identifier may be a vector that is stored in a CAM row 212 during a write operation for the CAM array 202. The CAM array 202 may be programmed in a similar manner as previously described for FIG. 2.

The processor 102 may perform a step 504 of programming the RAM array 208 of the graph cache 200 with the memory address for the neighbor node. The memory address is a location of the memory 106. The memory address may be a vector that is stored in a RAM row 216 during a write operation for the RAM array 208. The RAM array 208 may be programmed in a similar manner as previously described for FIG. 2.

Multiple edges of the graph structure may be stored in the graph cache 200. Specifically, when the target node has multiple neighbor nodes, the respective memory addresses for the neighbor nodes may be stored in respective RAM rows 216, and the identifier for the target node may be stored in each of the CAM rows 212 that correspond to those RAM rows 216. In other words, multiple CAM rows 212 of the CAM array 202 may be programmed with the identifier of the target node (in step 502) when multiple memory addresses are stored in the RAM array 208 (in step 504).

Figure 6:
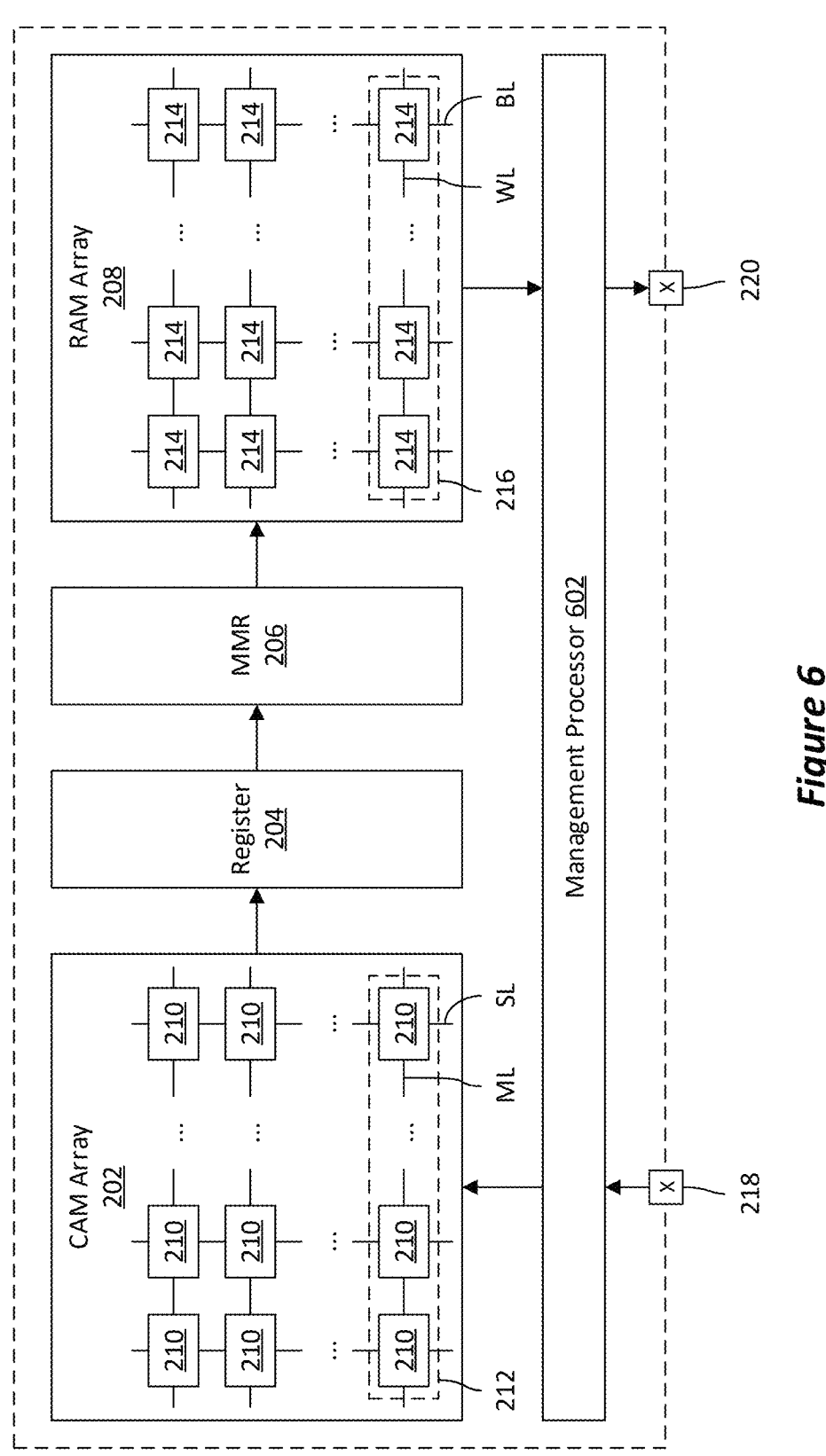
FIG. 6 is a block diagram of graph cache, according to some implementations.

FIG. 6 is a block diagram of graph cache 200, according to some implementations. This implementation is similar to the implementation of FIG. 2, except the graph cache 200 further includes a management processor 602. The management processor 602 may be configured to manage various operations of the graph cache 200, including security enforcement, role switching, and other management functions.

The management processor 602 may be connected to both the CAM array 202 and the RAM array 208. In some implementations, the management processor 602 may interface with the CAM array 202 through the search lines SL and with the RAM array 208 through the bit lines BL. This configuration allows the management processor 602 to control and monitor the operations of both arrays. Furthermore, the input port 218 and output port 220 may be connected to the management processor 602 instead of directly to the CAM array 202 and RAM array 208, respectively. Thus, the management processor 602 may act as an intermediary for data input and output (I/O) within the graph cache 200, performing additional processing or security checks on the data.

The management processor 602 may perform various security-related functions. For example, it may handle encryption and decryption of I/O data. The management processor 602 may receive encrypted inputs, such as encrypted node identifiers and/or encrypted keys, through the input port 218. The management processor 602 may then decrypt these inputs before providing them to the CAM array 202 for processing. Furthermore, the outputs from the RAM array 208 (e.g., embedding memory addresses) may be encrypted by the management processor 602. The encrypted outputs may then be provided through the output port 220.

The management processor 602 may utilize any suitable encryption algorithm for I/O. In some implementations, the management processor 602 may utilize asymmetric encryption algorithms such as RSA or elliptic curve cryptography. For data encryption and decryption, the management processor 602 may utilize symmetric encryption algorithms like AES in different modes of operation (e.g., CBC, GCM) depending on the security requirements. The management processor 602 may also implement secure key management practices, including key rotation and secure key storage using hardware security modules (HSMs) or trusted platform modules (TPMs).

The management processor 602 may also perform role switching functions. This may involve partitioning the graph structure stored in the graph cache 200 and controlling access to the partitions. The management processor 602 may maintain different access rights for different users or roles, and dynamically adjust the accessibility of data within the CAM array 202 and/or RAM array 208 based on the current user or role. In some implementations, the management processor 602 may partition the CAM array 202. This partitioning may be physical or logical, allowing different sections of the CAM array 202 to be allocated to different users, roles, or data sets. The management processor 602 may manage the creation, modification, and deletion of these partitions as needed.

The management processor 602 may also perform data swapping functions. Specifically, the management processor 602 handle the swapping of data in and out of the CAM array 202 and/or RAM array 208 to facilitate access to different partitions. This functionality may be useful when dealing with graph structures that are too large to fit entirely within the graph cache 200. The management processor 602 may coordinate the loading and unloading of different portions of the graph structure as called for by the current operations.

Additionally, the management processor 602 may perform various management operations for the graph cache 200, such as initializing the graph cache 200, monitoring its performance, handling errors, and the like. It may also implement quality of service policies, so that important read/write operations are prioritized within the graph cache 200.

The management processor 602 may be implemented as a dedicated controller, a microprocessor, an application-specific integrated circuit (ASIC), a field-programmable gate array (FPGA), a state machine, or any combination thereof. In some implementations, the management processor 602 may include memory for storing instructions and data, as well as interfaces for communicating with other components of the graph cache 200. The management processor 602 may be programmed with hardware and/or software modules to perform various functions, including encryption and decryption operations, security enforcement, role switching management, and other control operations for the graph cache 200.

Figures 7A, 7B:
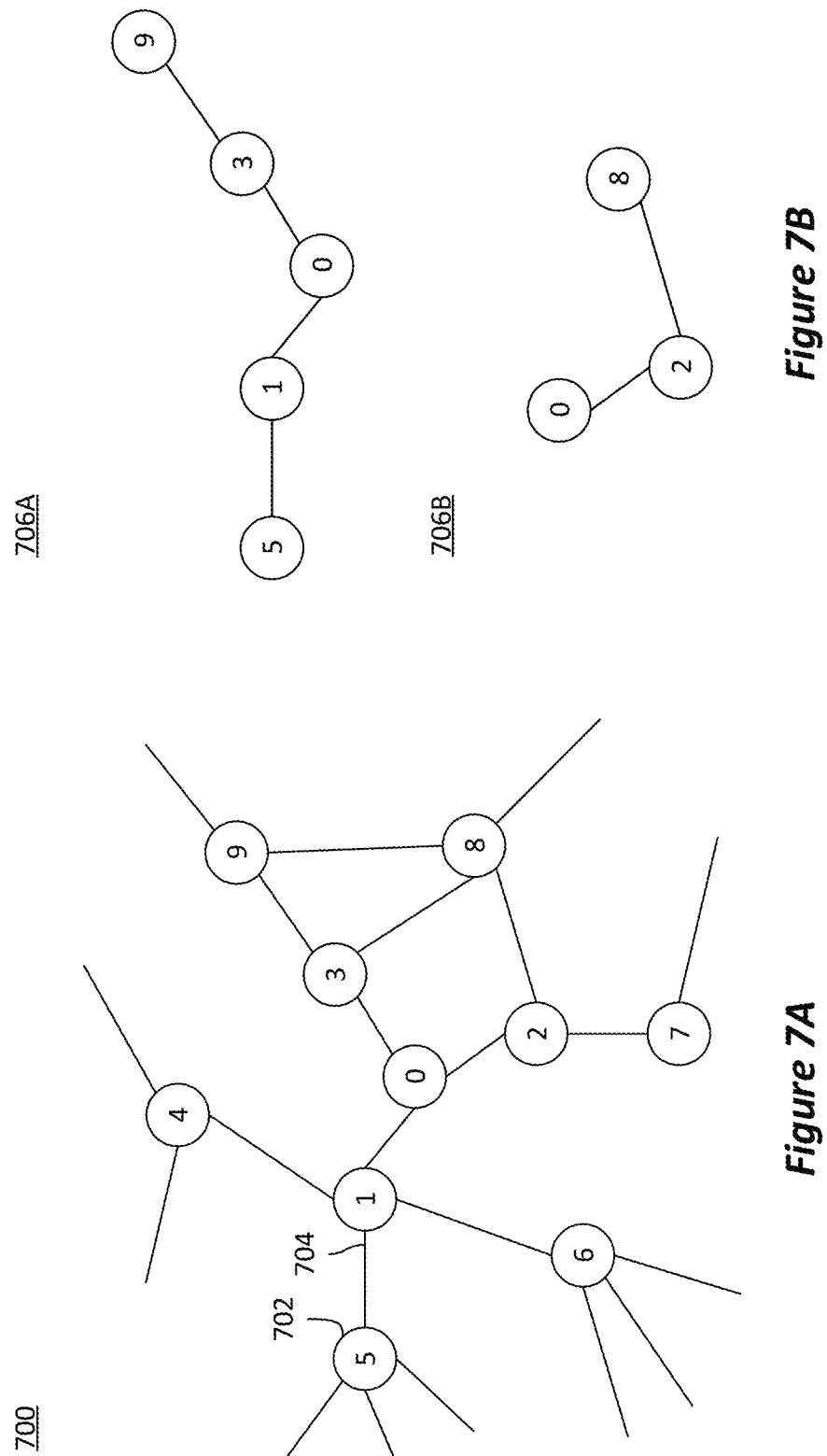
FIGS. 7A-7B illustrate the partitioning of a graph structure, according to some implementations.

FIGS. 7A-7B illustrate the partitioning of a graph structure, according to some implementations. FIGS. 7A-7B will be described in conjunction with the graph cache 200 of FIG. 6. As subsequently described, a graph structure stored within the graph cache 200 may be partitioned to enable security features and role-based access control.

FIG. 7A shows a graph structure 700. As previously noted, a graph structure includes multiple nodes 702 connected by edges 704. The graph structure 700 of this example includes nodes labeled 0 through 9.

FIG. 7B demonstrates the partitioning of the graph structure 700 into separate partitions. This partitioning may enable the implementation of different access rights, security features, and fast role switching capabilities. In this example, the graph structure 700 is partitioned into two partitions: a graph structure partition 706A and a graph structure partition 706B. The graph structure partition 706A includes a first subset of the original graph structure 700, such as nodes 0, 1, 3, 5, and 9 in this example. The graph structure partition 706A may represent a portion of the graph structure 700 accessible to users with a particular set of credentials or role. The graph structure partition 706B includes a second subset of the original graph structure 700, such as nodes 0, 2, and 8 in this example. The graph structure partition 706B may represent a portion of the graph structure 700 accessible to users with different credentials or roles than those which may access the graph structure partition 706A.

The example of FIGS. 7A-7B illustrates how a larger graph structure 700 may be partitioned to implement security features and role-based access control. This approach may allow for ultra-fast switching of which users may access what data in the graph structure 700. As subsequently described, partitioning of the graph structure 700 will be accomplished by partitioning the CAM array 202 of a graph cache 200 storing a graph structure. Users with different credentials or roles may have access to different data within the graph structure.

In some implementations, the partitioning of the CAM array 202 may be physical, with each graph structure partition 706A, 706B corresponding to a separate physical section of the CAM array 202. In some implementations, the partitioning may be logical, achieved through encryption or other access control mechanisms. The management processor 602 may enforce security, support switching functionality, and conduct management operations related to the graph structure partitions 706A, 706B. This partitioning approach may enable fast switching between different access levels in the graph cache 200, providing flexible control over graph structure data access. It may allow for efficient management of large-scale graph structures in scenarios where different users or roles need different levels of access to the graph structure data, such as in intelligence applications or other sensitive data environments.

Figure 8:
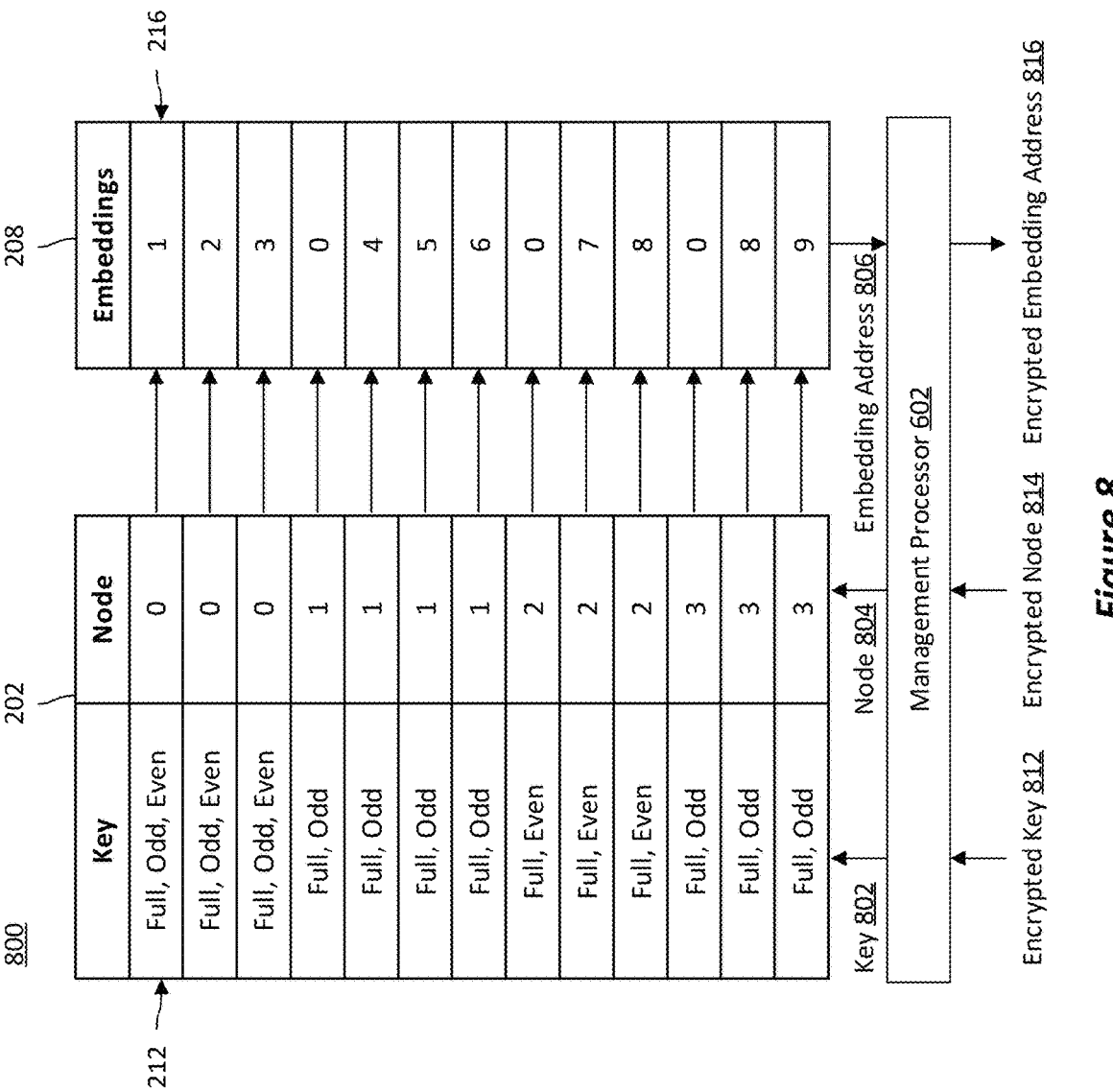
FIG. 8 illustrates a partitioning configuration of a graph cache, according to some implementations.

FIG. 8 illustrates a partitioning configuration 800 of a graph cache, according to some implementations. The partitioning configuration 800 will be described in conjunction with the graph cache 200 of FIG. 6. The partitioning configuration 800 of the graph cache 200 may be implemented using the management processor 602.

As previously noted, the CAM array 202 contains multiple CAM rows 212 and the RAM array 208, which contains RAM rows 216. In the partitioning configuration 800, each CAM row 212 stores a combination of a node identifier (previously described) and a key. For example, in a CAM row 202, a first subset of its CAM cells may store a key while a second subset of its CAM cells may store a node identifier. Each RAM row 216 corresponds to a CAM row 212 and stores an embedding value associated with the key-node combination.

In the partitioning configuration 800, the key stored in each CAM row 212 may correspond to different partitions of a graph structure or to the whole graph structure. For example, referring back to the example of FIGS. 7A-7B, a key may indicate whether a node belongs to the entire graph structure 700, the graph structure partition 706A, the graph structure partition 706B, or potentially other graph structure partitions. In this example, the keys include "Full," "Odd," "Even," or a combination thereof. Continuing the example of FIGS. 7A-7B, the "Odd" key may correspond to the graph structure partition 706A (which contains odd-numbered nodes), the "Even" key may correspond to the graph structure partition 706B (which contains even-numbered nodes), and the "Full" key may provide access to the entire graph structure 700. This key-based partitioning scheme may allow for flexible access control and efficient management of large graph structures. By combining a key with a node identifier in each CAM row 212, the system may quickly determine which partitions a node belongs to and manage access rights accordingly. This approach may enable fast switching between different user roles or access privileges without the need to reconfigure the entire graph structure.

In the partitioning configuration 800, nodes in the graph cache 200 are accessed by submitting a correct combination of a key and a node identifier. When a user attempts to access a node, they provide both the node identifier and the appropriate key corresponding to the user's access level or partition. The management processor 602 may receive these inputs, decrypt them if necessary, and use them to search the CAM array 202. If a user submits a node identifier with an incorrect or unauthorized key, it may indicate that the user's partition does not include the requested node. In such cases, the CAM array 202 may not find a match for the key-node identifier combination, effectively preventing access to that node by the user. For example, if a user with access to the "Odd" partition attempts to access an even-numbered node using the "Odd" key, the CAM array 202 may not find a match for the searched value. Such a mismatch may signify that the requested node is not part of the user's authorized partition, and therefore, the user is denied access to the node.

The partitioning configuration 800 may allow for fine-grained access control within a graph structure. Users with different roles or access levels may be restricted to particular nodes in the graph structure partitions; thus, they may only access the nodes and data relevant to their authorization level. The system may support various levels of access, e.g., from full graph structure access with a "Full" key to more limited access with partition-specific "Odd" or "Even" keys.

In some implementations, the management processor 602 provides a key 802 and a node identifier 804 to the CAM array 202. The key may be associated with a user credential. Furthermore, the management processor 602 receives an embedding address 806 from the RAM array 208. The key 802 may be a security key that corresponds to a specific partition or access level within a graph structure. The node identifier 804 may be an identifier for a target node in the graph structure. These inputs may be provided by the management processor 602 to search the CAM array 202 for matching key-node combinations. When a match is found, the corresponding embedding address of a neighbor node may be retrieved from the RAM array 208 and sent to the management processor 602. By processing these inputs and outputs, the management processor 602 may facilitate secure and efficient access to partitioned graph structure data based on user credentials and roles.

As previously noted, the CAM array 202 may be implemented with TCAM cells. The TCAM cells of a CAM row 212 may be programmed with appropriate wildcard values so that multiple keys may be stored within a single CAM row 212. Thus, a CAM row 212 may return a match when one of the multiple stored keys (along with the corresponding node identifier) is provided to the CAM row 212.

In some implementations, I/O with the management processor 602 is encrypted. The management processor 602 may receive an encrypted input, including an encrypted key 812 and an encrypted node identifier 814. The management processor 602 may decrypt the encrypted input using a public-private key pair shared between the graph cache 200 and a computing system that uses the graph cache 200. After decryption, the management processor 602 provides the decrypted inputs as the key 802 and the node identifier 804 to the CAM array 202. This encryption and decryption process enhances the security of the graph cache 200.

When a match is found in the CAM array 202 based on the key and node inputs, the corresponding embedding address may be retrieved from the RAM array 208. The embedding address 806 is then sent back to the management processor 602. The management processor 602 encrypts the embedding address 806 and outputs it an as encrypted embedding address 816.

The partitioning configuration 800 allows for different levels of access based on the key input. For example, a "Full" key may provide access to all embeddings of a graph structure, while "Odd" or "Even" keys may restrict access to specific subsets of embeddings of the graph structure. This partitioning scheme enables fast switching of user roles and access privileges without the need to reconfigure the entire graph structure.

In some implementations, the management processor 602 may be configured to swap data corresponding to different partitions in and out of the CAM array 202. This swapping functionality may allow the graph cache 200 to efficiently handle graph structures that are larger than the physical capacity of the CAM array 202. For instance, if the CAM array 202 can only store data for two partitions at a time, and a third partition needs to be accessed, the management processor 602 may swap out data for one of the current partitions and load in data for the requested third partition.

The management processor 602 may also be configured to create new partitions within the graph cache 200. Creating a new partition may involve allocating a new section of the CAM array 202 (either physically or logically), generating new encryption keys for the partition, establishing access rights for the partition, and potentially reorganizing existing data to accommodate the new partition.

Figure 9:
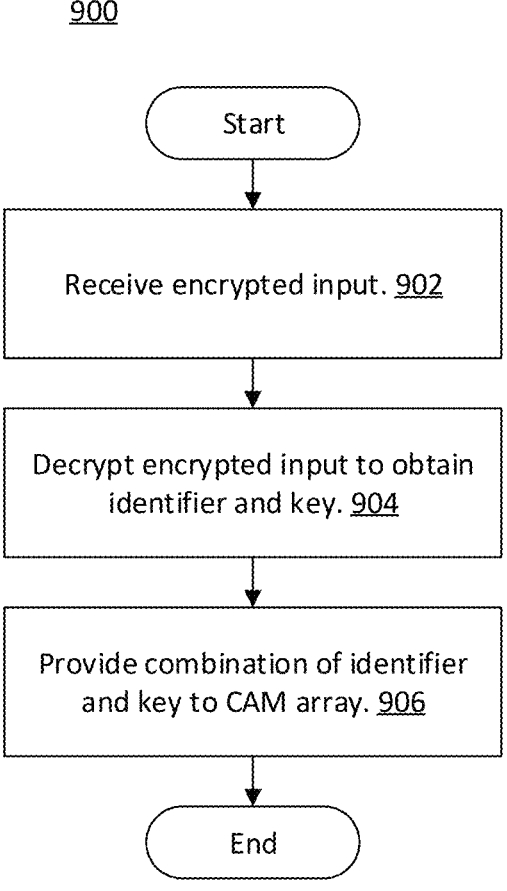
FIG. 9 is a flow diagram of a graph partitioning method, according to some implementations.

FIG. 9 is a flow diagram of a graph partitioning method 900, according to some implementations. The graph partitioning method 900 will be described in conjunction with the partitioning configuration 800 of FIG. 8. The graph partitioning method 900 may be implemented by the graph cache 200. Specifically, the management processor 602 may perform the graph partitioning method 900.

The management processor 602 may perform a step 902 of receiving an encrypted input. The encrypted input may include an encrypted key and an encrypted node identifier.

The management processor 602 may perform a step 904 of decrypting the encrypted input to obtain an identifier and a key. The decryption process may use a public-private key pair shared between the graph cache 200 and a computing system that uses the graph cache 200.

The management processor 602 may perform a step 906 of providing a combination of the identifier and the key to the CAM array 202. This combination may be used to search the CAM array 202 for matching key-node combinations. The management processor 602 may receive an embedding address output from the RAM array 208 when a match is found in the CAM array 202. The management processor 602 may then encrypt this embedding address before outputting it from the graph cache 200.

Figure 10:
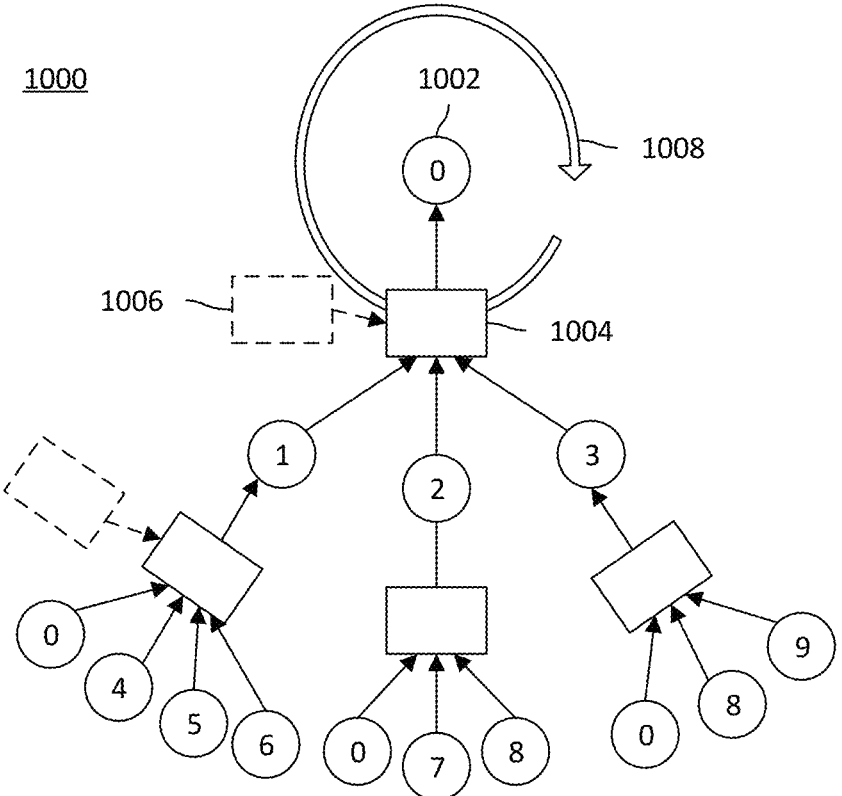
FIG. 10 illustrates a graph structure, according to some implementations.

FIG. 10 illustrates a graph structure 1000, according to some implementations. In this example, the graph structure 1000 is a spanning tree. As previously noted, a graph structure includes multiple nodes 1002. The graph structure 1000 of this example includes nodes labeled 0 through 9.

The nodes 1002 are interconnected to form a hierarchical graph structure 1000. The graph structure 1000 includes aggregations 1004. The aggregations 1004 are calculated by aggregating data from neighboring nodes 1002. A node 1002 may be updated based on an aggregation 1004 of its neighbor nodes 1002.

During a graph structure update process, new input data may be ingested into a graph structure 1000, such as in response to new inputs arriving. The graph structure's node embeddings and structure may be updated based on the input data. As part of ingestion, an existing aggregation 1004 may be replaced with a replacement aggregation 1006. Thus, new data may be quickly propagated through the graph structure 1000. For example, a computing system implementing a graph cache 200 may obtain the memory address of nodes 1002 neighboring a target node 1002 from the graph cache 200. When a replacement aggregation 1006 for a target node 1002 propagates through the graph structure 1000, the node embeddings of neighboring nodes 1002 are updated. The embeddings may be updated by directly accessing the memory addresses obtained from the graph cache 200. This process allows for rapid modification of the embeddings without needing to search through the entire graph structure. The computing system can quickly write new data to these memory locations, effectively updating the neighbor embeddings based on the packaged data represented by the replacement aggregation 1006. In some implementations, packaged data is passed from entry nodes 1002 to exit nodes 1002 of the graph structure, in a format similar to binary execution formatted data, and may be unpacked as it is delivered.

As a replacement aggregation 1006 propagates, it may update the embeddings of nodes 1002 which are directly connected to the existing aggregation 1004. This update process can then cascade to other nodes 1002 in the graph structure 1000, by accessing their respective memory addresses and updating their embedding data. The packaged data may be associated with one or more certificates. At each node 1002, certificates may be checked to confirm that the node 1002 being updated belongs to the correct processing elements (e.g., computing system).

The structure of the graph structure 1000 may be rebalanced, as represented by an arrow 1008, after node embeddings are updated. Updating node embeddings may result in the graph structure 100 being unbalanced. This rebalancing ensures the graph structure 1000 remains valid after incorporating the new data. The rebalancing may utilize time and spatial parallelism, as subsequently described, to propagate the whole package while the data for the nodes 1002 is being unpacked.

This configuration enables efficient switching between modes of operation of a graph cache 200, particularly between data ingestion and query processing. The system can rapidly ingest new data for the graph structure 1000 by quickly accessing and updating the relevant memory locations for node embeddings. This approach allows for rapid reconfiguration of graph neural networks, which may be useful in scenarios where rapid data ingestion is desired. Such rapid ingestion may reduce the freeze time during which a graph cache 200 is unavailable for normal operations during data ingestion.

In some implementations, a computing system may utilize a dual-buffer approach, where one memory buffer is used for active queries while another is updated with new data. This approach may allow for near-continuous availability of the graph cache 200, as the system can quickly switch between buffers once the update is complete. The management processor 602 of the graph cache 200 may coordinate this buffer switching to maintain data consistency and minimize disruption to ongoing operations. For example, the RAM array 208 of a graph cache 200 (storing the memory addresses) may be reprogrammed to quickly switch between memory buffers of the computing system during/after a graph structure update. Furthermore, the computing system may utilize incremental update techniques, where only the affected portions of the graph structure 1000 are modified during ingestion. This targeted approach may reduce the overall freeze time by limiting the scope of updates and allowing unaffected parts of the graph structure 1000 to remain accessible for queries.

Figure 11:
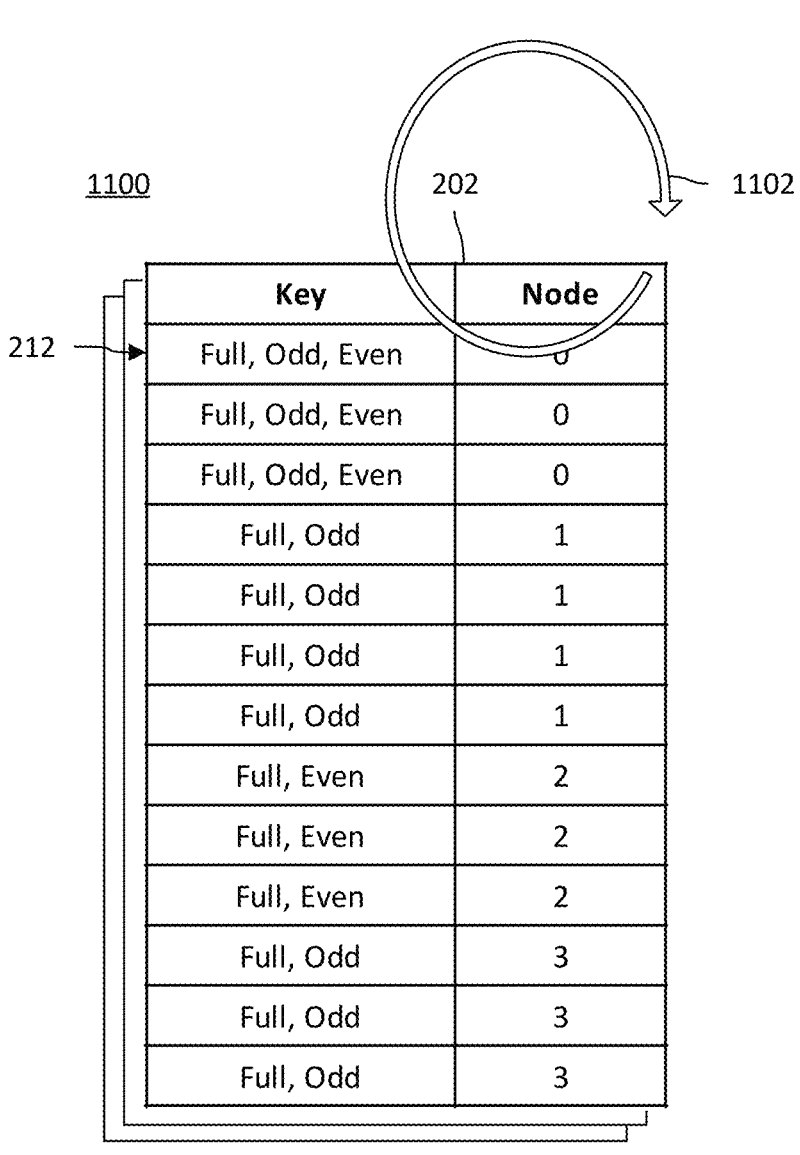
FIG. 11 illustrates a rebalancing configuration of a plurality of graph caches, according to some implementations.

FIG. 11 illustrates a rebalancing configuration 1100 of a plurality of graph caches, according to some implementations. The rebalancing configuration 1100 will be described in conjunction with the graph cache 200 of FIG. 6. The rebalancing configuration 1100 may be implemented using the management processors 602 of multiple graph caches 200.

A large graph structure may be too extensive to fit within a single graph cache 200. As a result, it may be distributed across multiple graph caches 200. These graph caches 200 may be deployed across various hardware configurations, such as multiple boards, multiple nodes, multiple enclosures, multiple racks, or even multiple data centers. Each graph cache 200 in this distributed configuration may include a content addressable memory (CAM) array 202. FIG. 11 shows multiple CAM arrays 202, each represented as a table having the previously described combinations (e.g., of node identifiers and keys) stored in the CAM rows 212.

An arrow 1102 represents a rebalancing or reorganization process that may occur across the distributed graph caches 200. This rebalancing process may involve dynamically reprogramming the CAM arrays 202 to modify the distribution of the graph structure across the graph caches 200. The rebalancing may be performed to maintain efficiency, load balance, adapt to changes in the graph structure, or preserve the graph structure during an update. Such rebalancing may be performed by the management processor 602 of each graph cache 200, programming its respective CAM array 202. The rebalancing may be performed locally (within the graph caches 200) then globally (across the graph caches 200).

The rebalancing process across the distributed graph caches 200 may utilize various algorithms depending on the specific requirements of the computing system. One approach is to use a distributed hash table (DHT) to determine the optimal location for each node or partition. Alternatively, a gossip protocol may be used where each graph cache 200 periodically communicates with its neighbors to exchange load information and migrate data as needed. The computing system may also implement a hierarchical rebalancing strategy, where rebalancing occurs at multiple levels-within a single graph cache 200, across graph caches 200 on the same board or rack, and finally across different data centers. During rebalancing, the computing system may maintain data consistency by using techniques such as two-phase commit protocols or eventual consistency models.

Figure 12:
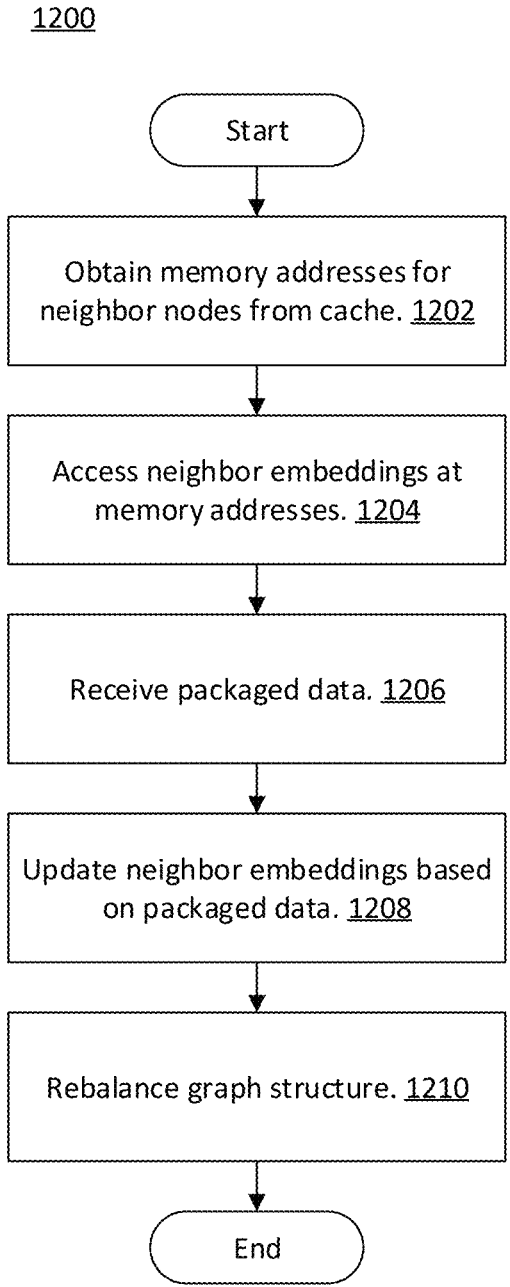
FIG. 12 is a flow diagram of a graph updating method, according to some implementations.

FIG. 12 is a flow diagram of a graph updating method 1200, according to some implementations. The graph updating method 1200 will be described in conjunction with the computing system 100 of FIG. 1 and the rebalancing configuration 1100 of FIG. 11. The graph updating method 1200 may be implemented by the computing system 100. Specifically, the processor 102 may perform the graph updating method 1200.

The processor 102 may perform a step 1202 of obtaining memory addresses for neighbor nodes of a target node from the graph cache 200. The graph cache 200 may store a graph structure including the target node and the neighbor nodes. The neighbor nodes may be connected to the target node in the graph structure. The memory addresses may be locations of the memory 106, the memory 106 being different than the graph cache 200. Obtaining the memory addresses may include querying the graph cache 200 with an identifier of the target node to retrieve the memory addresses of its neighboring nodes. The graph cache 200 may use its content addressable memory (CAM) array 202 to quickly look up the memory addresses based on the graph structure it stores.

The processor 102 may perform a step 1204 of accessing neighbor embeddings of the neighbor nodes at the memory addresses of the memory 106. After obtaining the memory addresses from the graph cache 200, the processor 102 may use these addresses to directly access the neighbor embeddings stored in the memory 106. These embeddings may represent various attributes or features of the neighbor nodes.

The processor 102 may perform a step 1206 of receiving packaged data. The packaged data may contain new information or updates that need to be incorporated into the graph. This data may be received from various sources, such as external sensors, user input, or other data processing systems. The packaged data may be formatted in a way that facilitates efficient processing and integration into the existing graph structure.

The processor 102 may perform a step 1208 of updating the neighbor embeddings of the neighbor nodes based on the packaged data. This may include processing the received packaged data and using it to modify or update the embeddings of the neighbor nodes in the memory 106. The updates may reflect changes in the attributes or features of the nodes based on the new information contained in the packaged data. Suitable calculations or transformations may be performed, depending on the nature of the graph and the type of data being ingested.

In some implementations, the packaged data may be associated with a certificate. The processor 102 may verify the packaged data belongs to the graph cache 200 based on the certificate. This verification process may help maintain the security and integrity of the data being ingested into the graph, preventing unauthorized or corrupted data from being processed. Additionally, other security measures may be utilized, such as calculating data variability, distributions, and other relevant metrics. The packaged data may be encrypted, such as for security reasons during transmission or storage. The processor 102 may decrypt the packaged data before updating the embeddings of the neighbor nodes.

The processor 102 may perform a step 1210 of rebalancing the graph structure within the graph cache 200 after updating the neighbor embeddings of the neighbor nodes. Rebalancing may be performed to maintain the validity of the graph structure after updates have been made to its nodes' embeddings. This may include reorganizing the graph structure within the graph cache 200 or redistributing data across multiple graph caches 200 (if the graph structure is distributed).

When the graph cache 200 includes a CAM array 202, rebalancing the graph structure may include programming the CAM array 202. This programming may involve updating the key-value pairs stored in the CAM array 202 to reflect the changes to the graph structure which are called for by the update process. The RAM array 208 of the graph cache 200 may also be programmed during the rebalancing.

When the graph cache 200 is one of a plurality of graph caches 200 storing the graph structure, rebalancing the graph structure may include updating the graph caches 200 in parallel. The graph caches 200 may be deployed across multiple boards, multiple nodes, multiple enclosures, multiple racks, or multiple data centers. This distributed approach may allow for efficient handling of large-scale graphs and enable parallel processing of updates and rebalancing operations.

Figure 13:
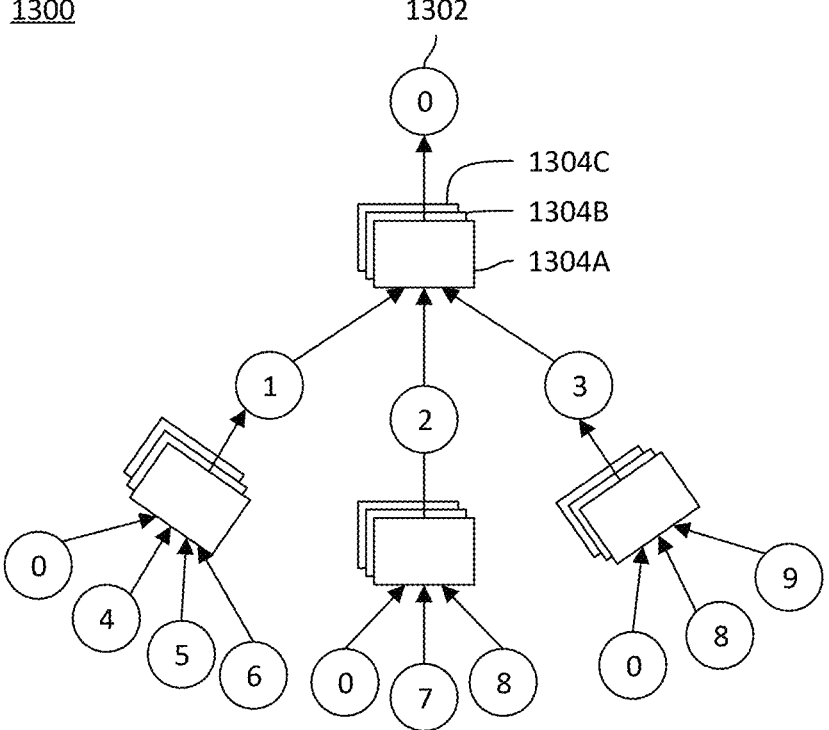
FIG. 13 illustrates a graph structure, according to some implementations.

FIG. 13 illustrates a graph structure 1300, according to some implementations. In this example, the graph structure 1300 is a spanning tree. The graph structure 1300 includes multiple nodes 1302.

The graph structure 1300 includes multiple layers of embeddings for the nodes 1302. In this example, the graph structure 1300 includes a first embedding layer 1304A, a second embedding layer 1304B, and a third embedding layer 1304C. The embedding layers 1304A, 1304B, 1304C may be used to achieve different forms of embedding calculations or different configurations of embeddings for the nodes. When processing a graph, a particular layer of embeddings may be selected. Thus, different embedding values for the graph may be used while maintaining the same graph structure 1300. The embeddings represented by the layers 1304A, 1304B, 1304C may be switched from one configuration to another. The embeddings may be either loaded from memory if already ingested or using a data ingestion process if not already ingested. This switching of embedding layers may enable different forms of embedding calculations for graphs having the graph structure 1300. Furthermore, this switching of embedding layers may enable granular access to embeddings. For example, users may have access to different embedding layers corresponding to their credentials.

The embeddings with the layers may be updated or installed using any of the aforementioned techniques. In some implementations, prior to installing embeddings in a layer, the signatures and keys from nodes may be compared for permission to install the embeddings. The embeddings within a layer may be propagated in parallel or using spanning trees to allow for faster spatial and time parallelism.

Figure 14:
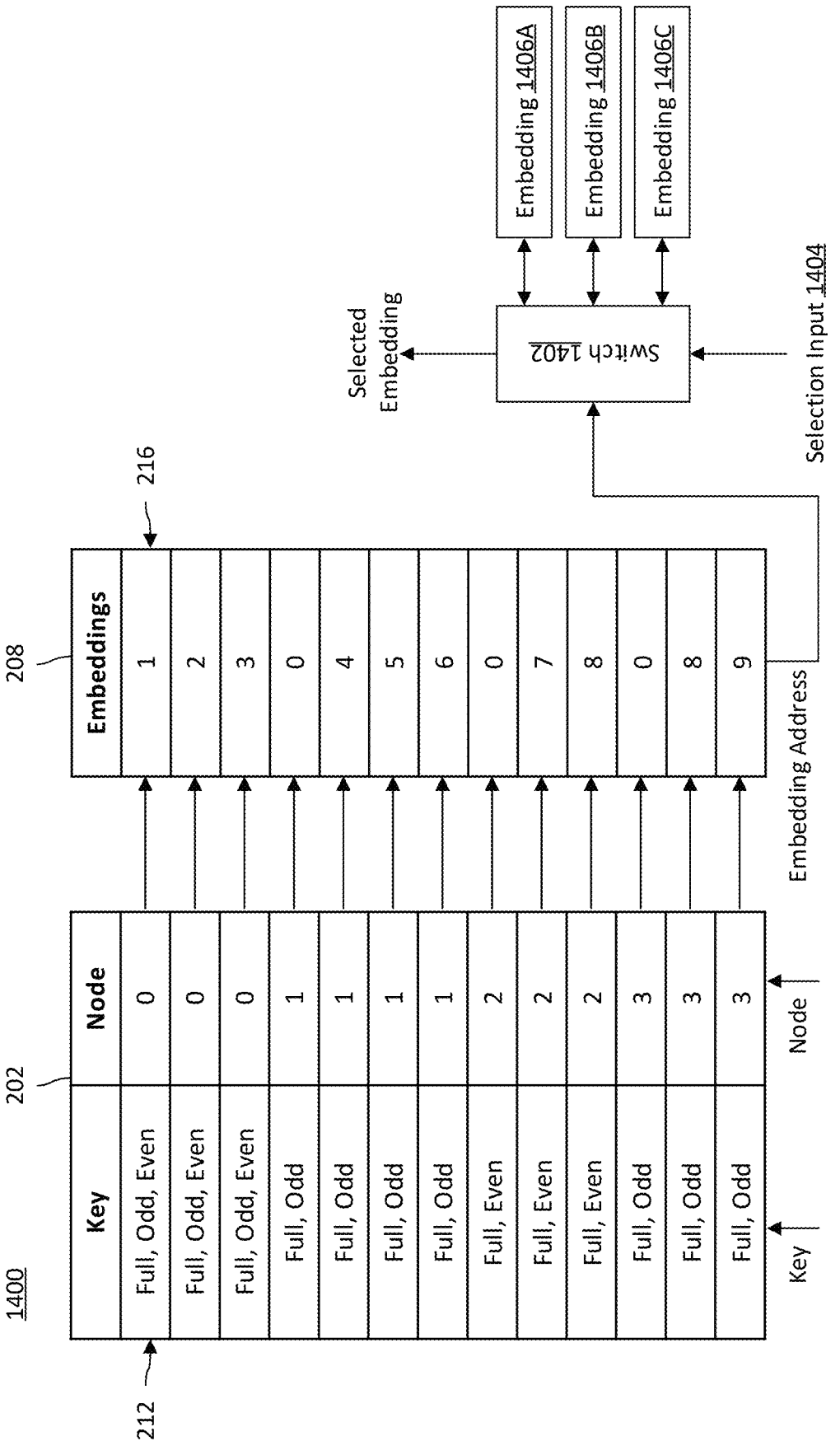
FIG. 14 illustrates a switching configuration of a graph cache, according to some implementations.

FIG. 14 illustrates a switching configuration 1400 of a graph cache, according to some implementations. The switching configuration 1400 will be described in conjunction with the graph cache 200 of FIG. 6. Although present within the graph cache 200, the management processor 602 is not separately illustrated in FIG. 14 for simplicity. The switching configuration 1400 is similar to the partitioning configuration 800 of FIG. 8, except the output of the RAM array 208 is fed to a switching mechanism 1402. The switching mechanism 1402 may be part of the graph cache 200 or may be part of a computing system implementing the graph cache 200.

The switching mechanism 1402 receives a selection input 1404 and can select an embedding from one of three different layers of embeddings, e.g., a first neighbor embedding 1406A, a second neighbor embedding 1406B, and a third neighbor embedding 1406C. The selection input 1404 may be selected based on an embedding calculation mode. The embedding selected by the switching mechanism 1402 is then output.

When a match is found in the CAM array 202 based on the key and node identifier inputs, the corresponding embedding address may be retrieved from the RAM array 208. The switching mechanism 1402 then allows for the selection of different embeddings from that address based on the selection input 1404. The switching configuration 1400 may allow for flexible access to different types of embeddings for the nodes of a graph.

The switching mechanism 1402 may be implemented physically or logically. In a physical implementation, the switching mechanism 1402 may include dedicated hardware components that route signals to different memory locations or modules based on the selection input 1404. In a logical implementation, the switching mechanism 1402 may include software-controlled memory management techniques. One example of a logical implementation is memory mapping. The implementing computing system may maintain multiple virtual address spaces, each corresponding to a different embedding layer or configuration. The selection input 1404 may then be used to dynamically remap virtual memory addresses to the appropriate physical memory locations where the desired embeddings are stored. This memory mapping technique may allow for flexible and efficient switching between different embedding configurations without requiring reprogramming the memory of the computing system. It may also allow the computing system to easily add or modify embedding layers by simply updating memory mapping tables, providing a scalable solution for managing complex graph structures with multiple embedding configurations.

Figure 15:
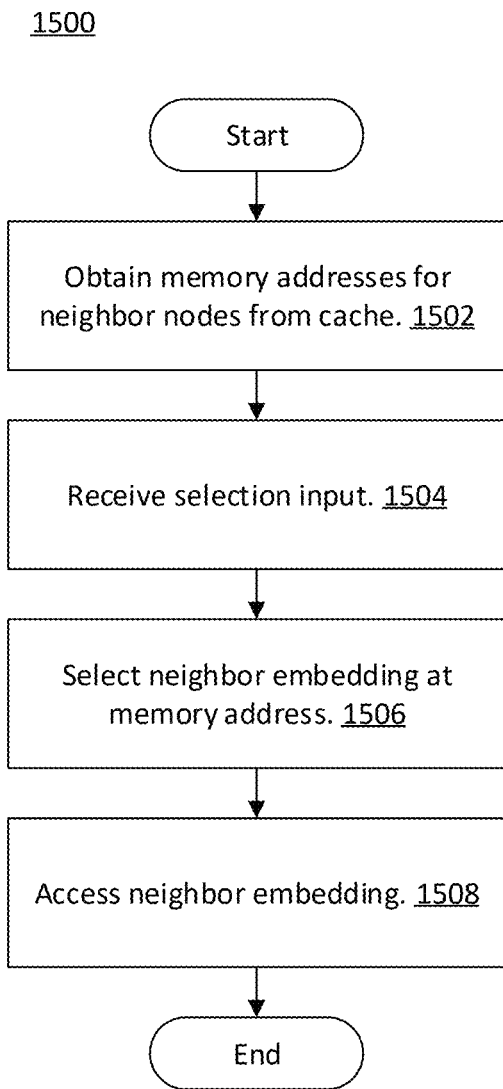
FIG. 15 is a flow diagram of a graph switching method, according to some implementations.

FIG. 15 is a flow diagram of a graph switching method 1500, according to some implementations. The graph switching method 1500 will be described in conjunction with the computing system 100 of FIG. 1 and the switching configuration 1400 of FIG. 14. The graph switching method 1500 may be implemented by the computing system 100. Specifically, the processor 102 may perform the graph switching method 1500.

The processor 102 may perform a step 1502 of obtaining a memory address for a neighbor node of a target node from the graph cache 200. The graph cache 200 may store a graph structure including the target node and the neighbor node. The neighbor node may be connected to the target node in the graph structure. The memory address may be a location in the memory 106, which is different than the graph cache 200.

The processor 102 may perform a step 1504 of receiving a first selection input 1404 for an embedding calculation mode. This selection input 1404 may determine which specific embedding will be accessed. The selection input 1404 may be provided by a user.

The processor 102 may perform a step 1506 of selecting a first neighbor embedding 1406A of a plurality of neighbor embeddings of the neighbor node at the memory address of the memory 106 based on the first selection input 1404. Thus, the appropriate embedding is selected based on the received selection input 1404.

The processor 102 may perform a step 1508 of accessing the first neighbor embedding 1406A. Thus, the actual embedding data for the chosen neighbor node is retrieved.

The first neighbor embedding 1406A may be selected and accessed through memory mapping of the memory address. In some implementations, the memory address from the graph cache 200 is a virtual memory address, and that virtual memory address is mapped to a physical memory location based on the selection input 1404. The first neighbor embedding 1406A may be accessed at the mapped physical memory location.

Other aspects are contemplated. In some implementations, the processor 102 may further perform steps of receiving a second selection input 1404 for the embedding calculation mode, selecting a second neighbor embedding 1406B of the plurality of neighbor embeddings at the memory address of the memory 106 based on the second selection input 1404 (the second neighbor embedding 1406B being different from the first neighbor embedding 1406A), and accessing the second neighbor embedding 1406B.

Figure 16:
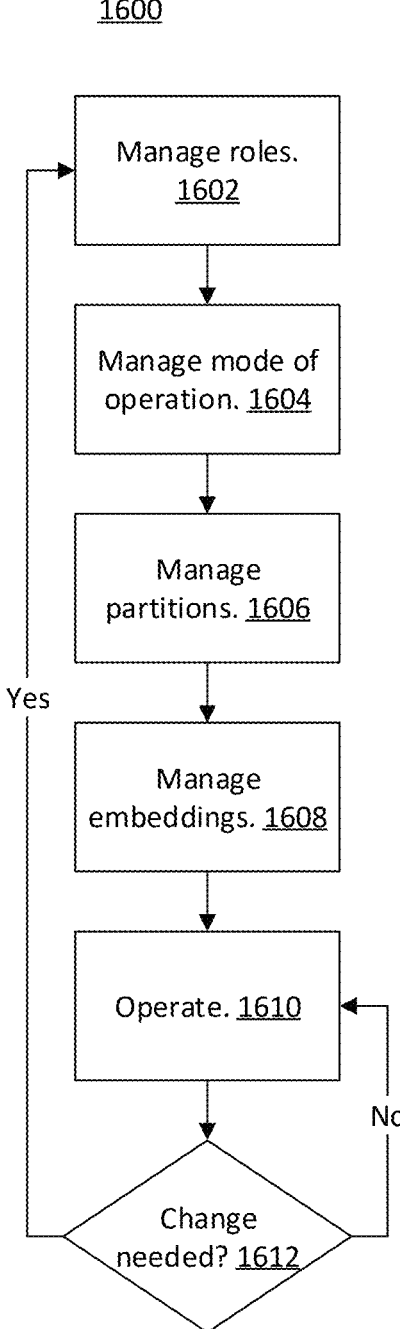
FIG. 16 is a flow diagram of a graph cache operating method, according to some implementations.

FIG. 16 is a flow diagram of a graph cache operating method 1600, according to some implementations. The graph cache operating method 1600 will be described in conjunction with the computing system 100 of FIG. 1 and the graph cache 200 of FIG. 6. The graph cache operating method 1600 may be implemented by the computing system 100, and is used for end-to-end operation of the graph cache 200. Specifically, the processor 102 and/or the graph cache 200 may perform steps of the graph switching method 1500.

The computing system 100 may perform a step 1602 of managing roles, which may involve switching between different user credentials or access levels, as described for FIGS. 8-9. This may include configuring the management processor 602 to enforce security, support switching, and conduct management operations related to user roles and access rights.

The computing system 100 may perform a step 1604 of managing the mode of operation of the graph cache 200. This may include switching between ingest and query modes, allowing for rapid data ingestion or regular inquiries as described for FIGS. 10-12. The computing system 100 may reconfigure the graph cache 200 to optimize for either data input or data retrieval operations.

The computing system 100 may perform a step 1606 of managing partitions. This may involve creating, modifying, or switching between different partitions of the graph structure, as described for FIGS. 8-9. The management processor 602 may reprogram the CAM array 202 to implement logical or physical partitions, enabling efficient access to different subsets of the graph structure data.

The computing system 100 may perform a step 1608 of managing embeddings. This may include switching between different forms of embedding calculations or configurations, as described for FIGS. 13-15. computing system 100 may reprogram the RAM array 208 or implement memory mapping techniques to change how embeddings are stored and accessed.

The computing system 100 may perform a step 1610 of operating based on the configured roles, modes, partitions, and embeddings. During this operation, the graph cache 200 may perform various tasks such as retrieving neighbor embedding addresses. Furthermore, the processor 102 may update node information using the configured settings.

The computing system 100 may perform a step 1612 of checking if a change is needed in the system configuration. If a change is needed, the process may return to step 1602 and initiate a new cycle of configuration adjustments. If no change is needed, the process may return to step 1610 and continue operating under the current configuration.

While the described techniques are particularly suited for in-memory architectures (e.g., the graph cache 200), similar principles may be applied to other digital architectures. For example, the described techniques may be applicable to serverless code deployments, container or virtual machine deployments, or behind-the-scenes controllers in private clouds.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A graph cache comprising:

a content addressable memory (CAM) array comprising CAM rows and match lines corresponding to the CAM rows, the CAM array configured to receive a combination of an identifier of a target node of a graph structure and a key associated with a user credential, to search for the combination of the identifier and the key in the CAM rows, and to activate ones of the match lines corresponding to the CAM rows that store the combination of the identifier and the key;

a random-access memory (RAM) array comprising RAM rows and word lines corresponding to the RAM rows;

a multiple match resolver connected to the CAM array and to the RAM array, the multiple match resolver configured to;

serially generate a plurality of output vectors corresponding to the match lines of the CAM array that are activated; and serially provide the output vectors to the word lines of the RAM array, wherein each of the output vectors activates a respective one of the word lines while remaining ones of the word lines remain deactivated; and a management processor configured to:

receive an encrypted input;

decrypt the encrypted input to obtain the identifier and the key; and provide the combination of the identifier and the key to the CAM array.

2. The graph cache of claim 1, wherein the management processor is further configured to partition the graph structure into partitions, and the key is associated with one of the partitions.

3. The graph cache of claim 2, wherein the partitioning of the graph structure is physical, with each of the partitions corresponding to a separate physical section of the CAM array.

4. The graph cache of claim 2, wherein the partitioning of the graph structure is logical, with each of the partitions corresponding to a separate logical section of the CAM array.

5. The graph cache of claim 2, wherein the management processor is further configured to swap data corresponding to different ones of the partitions in and out of the CAM array.

6. The graph cache of claim 1, wherein the encrypted input comprises an encrypted identifier and an encrypted key, and wherein the management processor is configured to decrypt the encrypted identifier and the encrypted key.

7. The graph cache of claim 1, wherein the management processor is configured to decrypt the encrypted input using a public-private key pair.

8. The graph cache of claim 1, wherein the CAM array further comprises search lines, the management processor is connected to the search lines, and the CAM array receives the combination of the identifier and the key on the search lines.

9. The graph cache of claim 1, wherein the RAM array further comprises bit lines, the management processor is connected to the bit lines, and the RAM array is configured to output memory addresses for neighbor nodes of the target node on the bit lines when the word lines are activated.

10. The graph cache of claim 9, wherein the management processor is further configured to encrypt the memory addresses for the neighbor nodes.

11. The graph cache of claim 1, further comprising:
a register connected to the match lines of the CAM array, an output of the register connected to an input of the multiple match resolver, the register being configured to store a match vector comprising high values, the high values corresponding to the match lines of the CAM array that are activated, wherein the output vectors generated by the multiple match resolver correspond to the high values of the match vector.

12. The graph cache of claim 1, wherein the CAM array is configured to simultaneously activate the match lines corresponding to the CAM rows that store the combination of the identifier and the key.

13. The graph cache of claim 1, wherein each of the output vectors comprises a plurality of values, each of the values being a low value except for one of the values being a high value.

14. The graph cache of claim 1, wherein the multiple match resolver is a match token multiple match resolver.

15. The graph cache of claim 1, wherein each of the CAM rows comprises a plurality of CAM cells, wherein a first subset of the CAM cells stores a key, wherein a second subset of the CAM cells stores an identifier.

16. The graph cache of claim 1, wherein the management processor is further configured to:
receive an embedding address from the RAM array;
encrypt the embedding address; and
output the encrypted embedding address.

17. The graph cache of claim 1, further comprising:
a register connected to the match lines of the CAM array, wherein the register is configured to store a match vector corresponding to the match lines of the CAM array, the match vector includes high values corresponding to the match lines of the CAM array that are activated, and the match vector includes low values corresponding to the match lines of the CAM array that are deactivated.

18. The graph cache of claim 1, wherein each of the CAM rows that stores the identifier of the target node corresponds to an edge connecting the target node to a neighbor node of the target node in the graph structure.

19. The graph cache of claim 1, wherein the CAM array is programmed with values corresponding to edges of the graph structure, and the RAM array is programmed with memory addresses pointing to embeddings of neighbor nodes of the target node stored in a memory external to the graph cache.

20. The graph cache of claim 1, wherein an input port and an output port of the graph cache are connected to the management processor, and the management processor is an intermediary for data input and output within the graph cache.

* * * * *